US009285060B2

(12) United States Patent
Griggs, III et al.

(10) Patent No.: US 9,285,060 B2
(45) Date of Patent: Mar. 15, 2016

(54) PIPE COUPLING WITH TEETHED INSERTS, METHOD OF SECURING TEETHED INSERTS, AND METHOD OF COUPLING PIPING

(75) Inventors: Donald Eugene Griggs, III, Oxford, AL (US); Robert Ross Smith, Villa Rica, GA (US)

(73) Assignee: TYCO FIRE PRODUCTS LP, Lansdale, PA (US)

( * ) Notice: Subject to any disclaimer, the term of this patent is extended or adjusted under 35 U.S.C. 154(b) by 1301 days.

(21) Appl. No.: 13/140,404

(22) PCT Filed: Dec. 22, 2009

(86) PCT No.: PCT/US2009/069311
§ 371 (c)(1),
(2), (4) Date: Jan. 20, 2012

(87) PCT Pub. No.: WO2010/075454
PCT Pub. Date: Jul. 1, 2010

(65) Prior Publication Data
US 2012/0112454 A1 May 10, 2012

Related U.S. Application Data

(60) Provisional application No. 61/140,430, filed on Dec. 23, 2008, provisional application No. 61/145,445, filed on Jan. 16, 2009.

(51) Int. Cl.
*F16L 17/04* (2006.01)
*F16L 21/00* (2006.01)
(Continued)

(52) U.S. Cl.
CPC ............... *F16L 17/04* (2013.01); *F16L 21/005* (2013.01); *F16L 21/065* (2013.01); *F16L 21/08* (2013.01)

(58) Field of Classification Search
CPC ....... F16L 17/073; F16L 21/06; F16L 21/065; F16L 23/04; F16L 25/08; F16L 17/04; F16L 17/10; F16L 21/08
See application file for complete search history.

(56) References Cited

U.S. PATENT DOCUMENTS 1,789,379 A * 1/1931 Dillon ........................... 285/104
1,905,324 A * 4/1933 Waters .................... F16L 17/04
   277/616
(Continued)

FOREIGN PATENT DOCUMENTS

WO   WO 2008/058025   5/2008

OTHER PUBLICATIONS

International Searching Authority, Written Opinion issued in International Application No. PCT/US09/069311, Mar. 31, 2010, 6 pages.
(Continued)

*Primary Examiner* — Daniel Wiley
(74) *Attorney, Agent, or Firm* — Perkins Coie LLP (57) ABSTRACT

A coupling for joining plan end pipe having a housing made from a casting with a pocket disposed in the casting. The pockets holds an insert that engages the plain end pipe, and the insert is secured to the housing without the use of machined features on the housing or the use of additional components or adhesives to secure the insert to the housing. In a preferred embodiment, each insert is disposed in a pocket on the inner surface of the coupling assembly, with projections extending from the inner surface disposed within cavities on opposing sides of each insert to retain the insert within the pocket by obstructing the opening to the pocket. A preferred device and method of forming the projections is a press that deforms the projections to retain the inserts in the pockets.

9 Claims, 10 Drawing Sheets

(51) Int. Cl.
*F16L 21/06* (2006.01)
*F16L 21/08* (2006.01)

(56) References Cited

U.S. PATENT DOCUMENTS

| | | | | |
|---|---|---|---|---|
| 1,930,194 | A | * | 10/1933 | Dillon ............................ 285/104 |
| 2,020,554 | A | * | 11/1935 | Johnson .................. F16L 17/04 |
| | | | | 285/104 |
| 2,417,741 | A | * | 3/1947 | Dillon ............................ 285/373 |
| 2,439,979 | A | * | 4/1948 | Krooss .......................... 285/419 |
| 2,449,795 | A | * | 9/1948 | Stillwagon .............. F16L 17/04 |
| | | | | 285/104 |
| 2,473,046 | A | * | 6/1949 | Adams, Jr ............... F16L 17/04 |
| | | | | 285/104 |
| 3,078,108 | A | * | 2/1963 | Smith .......................... 285/104 |
| 3,905,623 | A | | 9/1975 | Cassel |
| 6,170,884 | B1 | | 1/2001 | McLennan et al. |
| 2005/0253029 | A1 | * | 11/2005 | Gibb et al. .................... 248/158 |

OTHER PUBLICATIONS

International Searching Authority, International Search Report issued in International Application No. PCT/US09/069311, Mar. 31, 2010, 3 pages.

* cited by examiner

PIPE COUPLING WITH TEETHED INSERTS, METHOD OF SECURING TEETHED INSERTS, AND METHOD OF COUPLING PIPING

PRIORITY DATA AND INCORPORATION BY REFERENCE

This application is a 35 U.S.C. §371 application of International Application No. PCT/US2009/69311, filed Dec. 22, 2009, which claims the benefit of priority to U.S. Provisional Patent Application Nos. 61/140,430, filed Dec. 23, 2008, and 61/145,445, filed Jan. 16, 2009, each of which is incorporated by reference in its entirety.

FIELD OF THE INVENTION

The subject invention relates to the piping systems and, more particularly, to a coupling assembly for joining pipe and method of joining pipes with couplings.

BACKGROUND OF THE INVENTION

Existing pipe couplings have a gripping device disposed on the inner surface of the coupling housing so as to compress the gripping device against the pipe to secure the end of the pipe. The gripping device is typically secured to the housing with an adhesive or a pin to hold the gripping device in place prior to installation of the coupling to the pipe end and afterward when the coupling is removed and reinstalled. In particular applications, for example, pipe couplings are commonly installed and reinstalled as piping systems are assembled, disassembled, and reassembled when relocating or rerouting the piping system.

Both of the above-described securing methods, using an adhesive or a pin, involve connecting a first member (the gripping device) to a second member (the housing) with a third member (the adhesive or pin) that interacts with the first and second members. In both methods, the structure of the third member is disposed between the first and second members and communicates forces between the first and second members through the structure provided by the third member. The surfaces of the third member also engage the surfaces of the first and second members to communicate forces between the first and second members through these surfaces.

When adhesive is used to secure the gripping device, a layer of the adhesive is disposed between the housing and the gripping device and the forces applied by the housing to the pipe end are communicated through the adhesive layer to the gripping device and then to the pipe. Also, the surfaces of the adhesive layer engage the housing and the gripping device with an adhesion strength that is dependent on the characteristics of the adhesive and on the characteristics of the mating surfaces. It is believed that forces applied to the adhesive layer can undesirably weaken the adhesive layer over time, and that environmental factors such as temperature-induced stresses or dirt can further weaken the structural properties of the adhesive. It is also believed that the surfaces of the adhesive layer can be weakened due to the transmission of forces through the mating surfaces of the adhesive, housing, and gripping device and through the effects of the same environmental factors. Furthermore, it is believed that the repeated application of force to the coupling due to the repeated reinstallation of the coupling to a pipe system further weakens the adhesive and the adhesion of the adhesive to the housing and gripping device over time. The degradation of the adhesive layer or of the adhesive layer adhesion properties is believed to undesirably cause the gripping device to disengage from the coupling.

When a pin is used, the pin is disposed to extend between mating holes of the housing and gripping device. Forces applied by the housing are partly communicated through the pin and partly communicated directly to the gripping device. It is believed that forces applied to the pin over time can cause the pin to deform, loosen, or move out of position from the mating holes, thereby permitting the gripping device to undesirably disengage from the coupling. The repeated installation and reinstallation of the coupling is also believed to further apply stresses to the pin and can cause the pin to move out of position. The failure of the pin to maintain position is believed to undesirably cause the gripping device to disengage from the coupling, thereby preventing reinstallation of the coupling to a piping system. Furthermore, the installation of the pin requires a pin-receiving hole to be drilled that could extend through the housing to the channel of the housing that holds the gasket for the pipe coupling assembly. It is believed that a pin disposed in such a hole and extending in part into the channel can contact the gasket and possibly damage the gasket if a sharp edge of the pin end contacts the gasket.

When an adhesive or pin is used, it is believed that the thickness of the adhesive layer or placement of the pin does not permit the gripping device to fully compress against the housing, or bottom out, as would be achieved without the presence of the adhesive layer or pin. Namely, it is believed that the mating surfaces of the gripping device and housing deform when compressed during coupling installation, which causes the gripping device to deform the housing slightly and thereby redistribute forces to structures opposing the compression, such as an adhesive layer or a pin placed before the application of the compressive force. It is further believed that the repeated application of such forces to the adhesive or pin over time cause the adhesive or pin to degrade, weaken, or deform, thus permitting the gripping device to disengage from the coupling when the coupling is repeatedly removed from or readjusted on the pipe ends.

Some existing gripping devices have a single bend disposed between two straight portions of the gripping device, which presents two straight surfaces to the pipe ends when the gripping device is compressed against a pipe. This is believed to disadvantageously limit the amount of contact between the gripping device and the pipe, and to thus reduce the strength of the pipe coupling.

SUMMARY OF THE DISCLOSURE

The present invention provides a coupling housing formed to have surfaces that secure an insert to the housing without the need to drill holes or machine the surfaces of the housing and without the use of additional components or adhesives to secure the insert to the housing. In a preferred embodiment, the coupling housing is made from a casting, and more preferably formed from a sand casting, to provide a pocket with surfaces that do not require machining or the use of additional components to secure the insert to the housing. The invention also provides a coupling for joining plain end pipes together with the coupling housing made of a first material that is a casting and an insert disposed on the inside of the coupling and made of a second material that is harder than the first material, and with the insert secured to the coupling housing without the use of a third component or material. Further provided is a structure and method that secures the position of the insert relative to the housing with a portion of housing or insert formed or deformed to maintain the engagement of the insert to the housing.

A preferred embodiment of coupling assembly includes at least first and second coupling members that together form an inner surface of the coupling that defines an axis of the coupling and a central channel holding a seal that abuts the ends of the two pipes to be joined with the coupling. On the inner surface are preferably disposed two rows of pockets distributed circumferentially about the surface on each side of the channel, with each pocket having walls and a bottom, and a pocket opening defining a pocket edge. The pocket edge preferably has projections extending from the pocket edge to provide opposing projections. An insert disposed within the pocket extends through the pocket opening to present teeth of the insert towards the mating pipe ends. The projections have terminal ends disposed within cavities of the insert to retain the insert within the pocket.

A preferred embodiment of the coupling housing also has an arcuate housing body defining a curved inner surface of the housing, with the curved inner surface defining a longitudinal axis of the coupling housing, and with the inner surface further defining a pocket opening communicating with a pocket disposed within the housing body. The pocket preferably has a pocket wall and a pocket bottom, and the pocket wall adjoins the inner surface to define an edge of the pocket opening, and a projection extends from the pocket opening edge in a direction away from the inner surface. The pocket wall also includes first and second wall portions disposed on opposing sides of the pocket, with the first and second wall portions sloping away from each other in a direction that is orthogonal to the axis. The pocket wall also includes first and second wall portions disposed on opposing sides of a radius extending orthogonally from the axis through the pocket, with the first and second wall portions oppositely sloping away from the radius. The projections extend in a direction away from the inner surface towards the axis or towards the pocket opening. An insert is disposed in the pocket, with the insert having rows of teeth extending from the insert.

Another preferred embodiment of the coupling housing has a housing body with at least two types of surfaces on the inside surface of the housing facing the axis of the coupling housing: (1) a first surface with a constant-radius curvature that presents a relatively smooth inner surface of the coupling housing and (2) a second surface with a variable-radius curvature that presents a curved or angled surfaces curving or angling away from the axis of the coupling housing. The first and second surfaces together define an edge disposed between these two types of surfaces from which projections extend to secure the insert to the housing. A preferred embodiment has the first surface being a constant-radius surface of the coupling housing that is disposed between other surface features, such as between the ends of the housing and the channel for the seal, and has the second surface being a pocket. In other preferred embodiments, the second surface is a cavity, a depression of the housing inner surface that extends radially away from the first surface, or a hole through the coupling housing defined by the second surface. Another preferred embodiment has a housing body with an inner surface disposed about a longitudinal axis, with the inner surface including a first curved portion defined by a fixed distance from the axis and a second curved portion defined by a varying distance from the axis, and with the first curved portion and the second curved portion meeting at an edge and opposing projections extending from the edge towards each other.

A preferred embodiment of the pipe coupling includes a coupling housing body having an inner surface defining a longitudinal axis and a pocket opening communicating with a pocket extending into the housing body away from the axis, an insert disposed in the pocket, and a projection of the housing body extending from the inner surface to obstruct the pocket opening and retain the insert in the pocket.

Another preferred embodiment of a coupling housing with an inner surface that defines a pocket opening communicating with a pocket extending into the coupling housing, an insert disposed in the pocket and extending through the pocket opening, and means for obstructing the pocket opening to retain the insert in the pocket. In a preferred embodiment, the means for obstructing includes opposing projections that extend from the housing to obstruct the pocket opening and, in other preferred embodiments, include projections disposed about the pocket opening at different locations.

A preferred method includes a method of disposing an insert between a wall of a coupling housing and a longitudinal axis of the coupling housing, with a side of the insert facing the axis defining a space extending orthogonally to the axis between the side of the insert and the axis, and deforming a portion of the wall from a first position adjacent to the space to a second position within the space to secure the insert to the wall. Another method includes positioning an insert to abut a wall of a coupling housing, with the coupling housing defining a longitudinal axis, and deforming a portion of the wall that extends in the direction orthogonal to the axis to a position that extend parallel to the axis. Yet another method includes locating an insert within a pocket of a coupling assembly, with an opening of the pocket including opposing projections, and deforming terminal ends of the opposing projections to retain the insert within the pocket.

A preferred device for achieving the deformation of the projections is provided. A preferred embodiment of the device is a press having a press plate with a surface that has projection engagement portions that simultaneously deform a plurality of projections extending from a coupling housing, with the surface of the plate further defining a space disposed between the projection engagement portions to receive an insert extending from the coupling housing. A preferred method of pressing includes a method of positioning projections extending from an edge of a pocket of a coupling housing to a predetermined orientation within a press, and pressing the projections with the press to retain an insert in the coupling housing.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIGS. 1B-1C are drawn to scale.

FIGS. 1D-1F are views of an alternative to the coupling assembly of FIG. 1A with bolt assemblies. FIGS. 1D-1E are plan and side views. FIGS. 1D-1E are drawn to scale. FIG. 1F is drawn to scale.

FIGS. 2A-2E are views and cross section views of the insert of FIG. 1A. FIG. 2D is a cross-sectional view based on FIG. 2C. FIGS. 2A-2E are drawn to scale.

FIGS. 3A-3I are views of a preferred method of mounting of the coupling assembly of FIG. 1A. FIG. 3A schematically illustrates the coupling assembly of FIG. 1A.

FIGS. 5A-5F are views and cross section views of a portion of the coupling assembly of FIGS. 1D-1F. FIG. 5A is a top view. FIGS. 5A-5D are drawn to scale. FIGS. 5E-5G are drawn to scale that is greater than the scale of FIGS. 5A-5D.

FIG. 7 is drawn to scale.

DETAILED DESCRIPTION

As illustrated in FIGS. 1A-1E, the preferred coupling assembly 10 has a housing 12 with a series of pockets 30 that each hold an insert 40, with each insert retained in the pocket by a projection 50 that extends from the housing to block the exit of the insert from the pocket. The pocket preferably prevents the insert from moving in all directions except in the direction of the pocket opening facing the center of the coupling, with the projection preventing the insert from moving out of the pocket through the pocket opening. The insert is preferably retained with a portion of the housing which is formed or deformed to extend over the pocket to obstruct the pocket opening and retain the insert in the pocket. It should be understood that the term pocket describes a surface that defines a volume corresponding to a portion of an insert disposed in the pocket, and thus includes surfaces that only partially surround the insert and that define pocket walls having gaps or holes disposed therein. In an alternative embodiment, the walls defining the pocket include wall portions extending from the coupling housing with openings disposed between the wall portions. In another alternative embodiment, the walls of the pocket surround the pocket on the bottom and on two opposing sides with no walls at opposing ends of the pocket, thus presenting a single long pocket that extends about the entire circumference of the coupling housing.

As illustrated, the coupling assembly 10 preferably connects two pipes 20, 22 together with a seal 24. The coupling assembly 10 includes opposing housings 12 that join each other to form the assembled coupling 10 about a longitudinal axis 14, and bolts 16 that secure the housings together at extensions 18 formed at mating portions of the housings. An inner surface 27 of the coupling assembly includes a central groove 28 circumferentially extending along the coupling inner surface 27 about the axis 14 to hold the seal 24 in place on mating ends of the two pipes 20, 22. The coupling inner surface also includes a series of pockets 30 circumferentially distributed in two rows 32 about the axis, with a row 32 on each side of the central groove 28, and with spacing 34 disposed between each pocket 30. Each pocket holds an insert 40 having teeth 41 that extend inwardly towards the axis 14, with the insert 40 being retained in the pocket 30 by terminal ends 52 of projections 50 that extend from opposing edges of the pocket to a position over the insert to retain the insert within the pocket. As illustrated in FIGS. 2A-2E, the insert 40 includes side surfaces 42 that have cavities 44 that receive the terminal ends 52 of the projections 50 and that block the exit of the insert from the pocket when the side surfaces abut the terminal ends of the projections. When the coupling assembly is disposed on the pipe ends, the teeth 41 of the inserts 40 abut the pipe ends and engage outer surfaces 21 of the pipe ends to provide a friction fit that holds the two pipe ends together while maintaining the position of the seal on the pipes.

In use, the pipe ends preferably are prepared or shaped to provide squared ends to the pipes and to apply markings on the outer surfaces of each pipe end to note desired positions of the seal and coupling upon the pipe. More preferably, as illustrated in FIGS. 3A-3I, after the ends of the pipes are squared to an angle P or less, first and second markings 26a, 26b are applied to each pipe end with the first marking 26a being disposed closer to the end of the pipe than the second marking 26b, and with the first marking noting a desired position of the seal and with the second marking noting a desired position of the coupling. One end of the seal 24 is lubricated and then slid over one of the pipe ends 20 and the other pipe end 22 is inserted into the other end of the seal, and the seal is then preferably further slid over the pipe ends as needed to align the seal with the first markings 26a of each pipe end.

One of the housings is then preferably connected to the other housing by passing a bolt through only one of the mating extensions of the housings to form a housing-bolt-housing subassembly 11. The other one of the mating extensions remains unbolted so that the housing-bolt-housing subassembly presents an open configuration that permits positioning of the subassembly over the seal disposed on the mating pipe ends. After placement of the subassembly 11 over the seal 24, the subassembly is moved to a closed position and another bolt 16 is passed through the other one of the mating extensions to form the assembled coupling 10. Nuts on the bolts are then tightened and the housings are brought towards each other, which causes the inwardly extending teeth of the inserts to bite into the outer surfaces of the pipe ends. The teeth indent and deform the outer surfaces of the pipe ends and thus secure the coupling to the pipe ends.

Figure 2A:
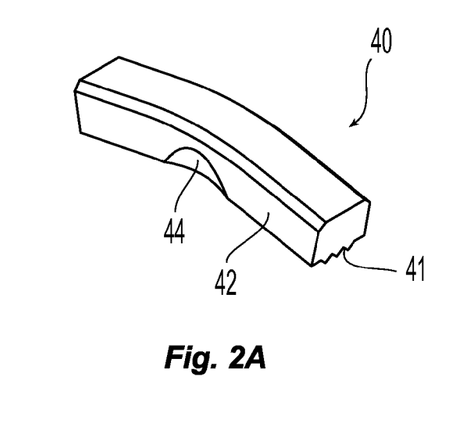
FIG. 2A is an isometric view.
Figure 2B:
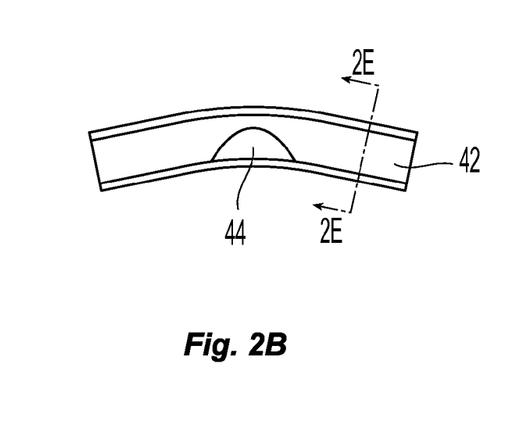
FIG. 2B is a plan view.
Figure 4:
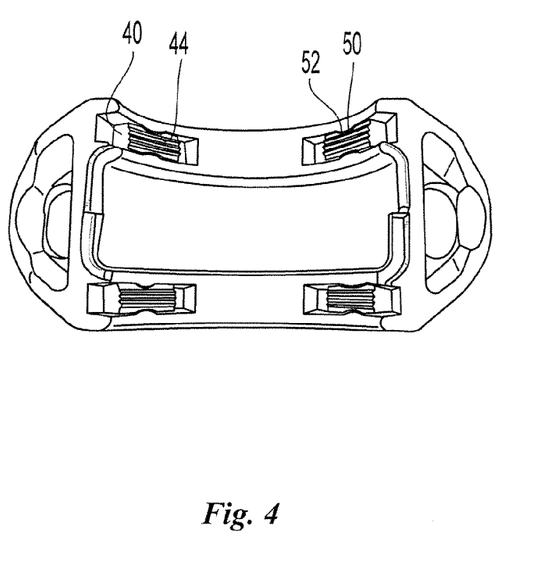
FIG. 4 is a perspective view of a portion of the coupling assembly of FIG. 1A.

Preferably, the inserts 40 are disposed within the pockets in an arrangement that retains the inserts firmly against the bottom of the pockets. Also preferably, the bottom surfaces of the pockets are formed to provide a curvature the matches the curvature of the outer surfaces of the pipe ends, and the inserts have outward facing surfaces that uniformly abut the pocket bottoms and that present the teeth of the insert to the pipe with a curvature that matches the curvature of the pipe ends. Alternatively, the curvatures of the pocket bottoms vary so as to allow the inserts to move slightly in the pocket about a hinge point created by the interaction between the terminal ends 52 of the projections 50 and the cavities 44 of the inserts, which are centrally located along the length of the inserts, as illustrated in FIGS. 2A and 4. This hinged motion preferably permits the insert to adjust position to present the teeth evenly to the outer surface of the pipe ends, by allowing the ends of the insert to move radially inward or outward slightly and thus evenly distribute the forces on the insert that are developed between the teeth and the outer surface of the pipe ends.

When the inserts are compressed against the pipes as the bolts are tightened, the inserts bottom out in each pocket, i.e., the inserts press against the pocket bottoms. This bottoming out preferably relieves all or a majority of the stresses existing between cavities of the inserts and the terminal ends of the projections extending into the cavities, which advantageously preserves the ability of the projections to retain the inserts within the pockets. Also, when the bolts of the coupling are tightened, forces are generated in the housing are communicated radially inward to the teeth. As the inserts bottom out, the forces directed radially inward from the housing pass through the pocket bottom to the insert, and then from the insert to the teeth and then to the pipe. These forces preferably minimally transmit, and more preferably do not transmit, through the interface between the cavities and the terminal ends of the projections, thereby advantageously avoiding or minimizing the application of stresses to the surfaces retaining the inserts in the pockets, and also thereby preserving the ability of the projections to retain the inserts within the pockets.

Furthermore, the preferred insert does not require the use of additional components to retain the insert within the pockets of the coupling assembly, which advantageously reduces assembly complexity. The coupling housing itself preferably provides the structure that retains the insert in the pocket, thus avoiding the complexity required to size or place a third component intended to maintain the position of the insert relative to the coupling, or to machine the housing or insert to accept a pin. More preferably, the coupling housing provides a structure that is formed in a first orientation to permit placement of the insert in the pocket, and that is capable of being deformed into a second orientation to retain the insert in the pocket. Still more preferably, the coupling housing provides an opening for the pocket that has a first size that is sized to permit the insert to be placed in the pocket through the pocket opening, and a second size of the pocket opening that is smaller than the first size and sized to prevent the insert from exiting the pocket. Alternatively, instead of the housing providing the structure that retains that insert in the pocket, the insert includes a structure that has a first orientation that permits the insert to be placed in the pocket through the pocket opening, and a second orientation that prevents the insert from exiting the pocket, such as a deformable tab that extends from the insert and that engages a slot on the housing with the deformation of the insert tab within the slot oriented to prevent the insert from existing the pocket.

Figure 1A:
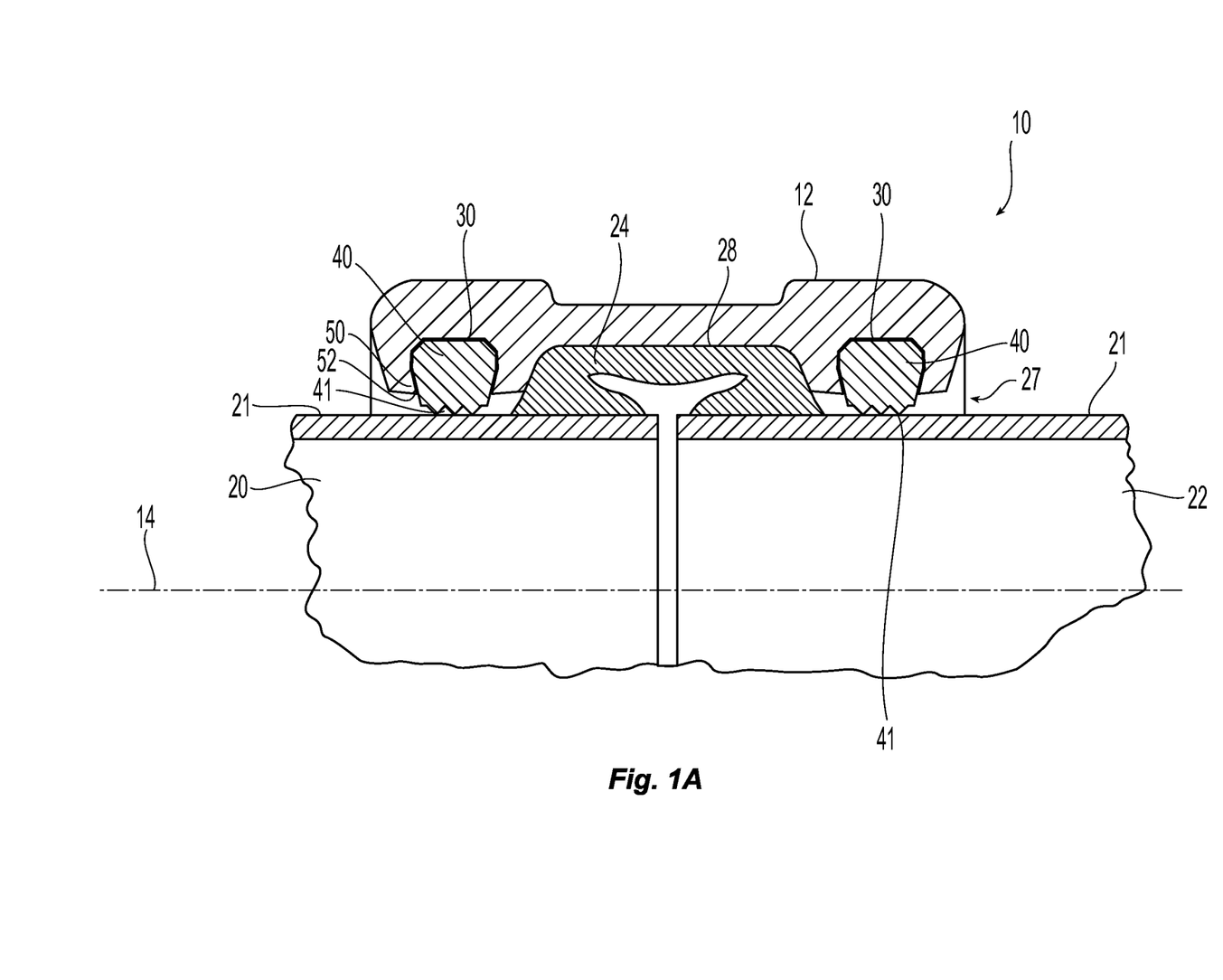
FIG. 1A is a cross-section view of the preferred coupling assembly mounted with a seal on portions of two pipes.
Figure 1B:
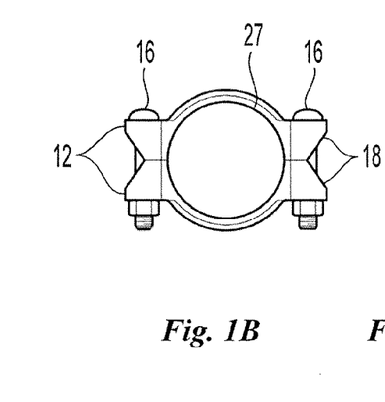
FIGS. 1B-1C are plan and side views of the coupling assembly of FIG. 1A with bolt assemblies.
Figure 1C:
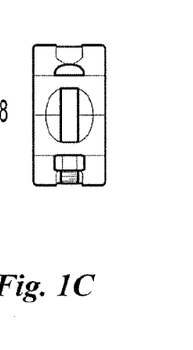
Figure 1D:
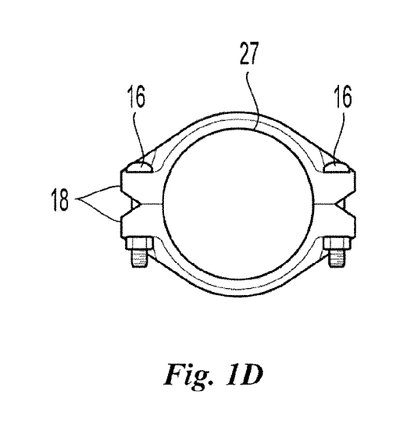
Figure 1E:
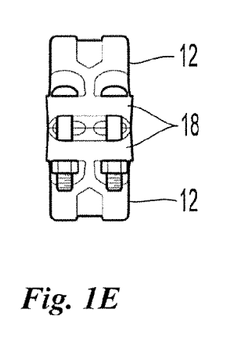
Figure 1F:
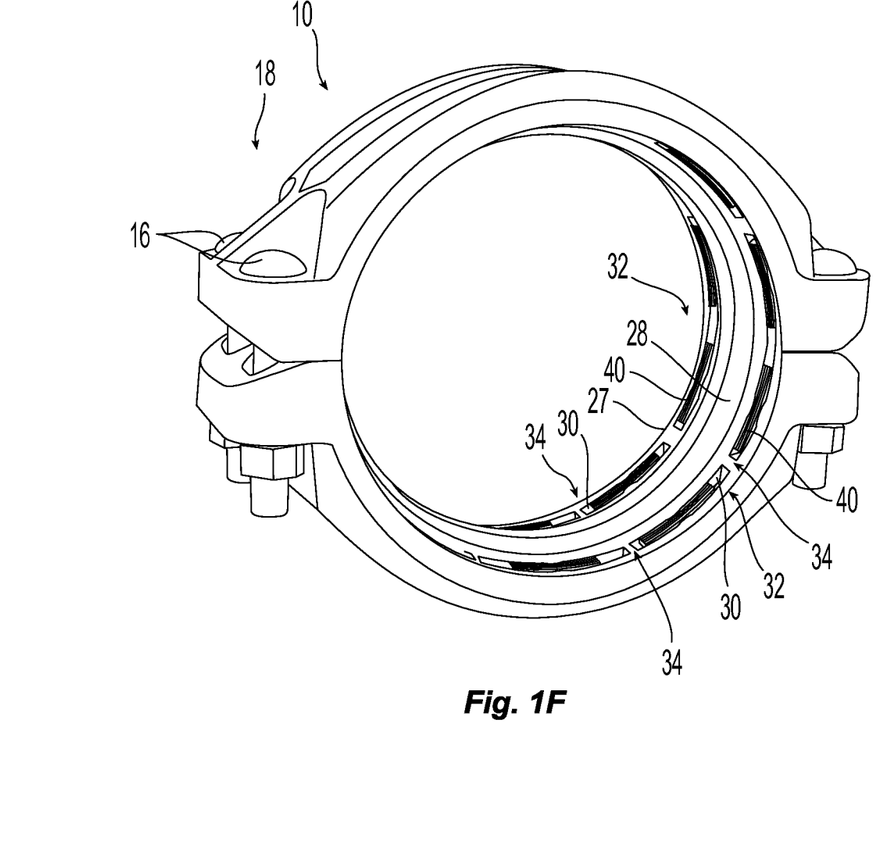
FIG. 1F is an isometric view with bolt assemblies and a seal.
Figure 5A:
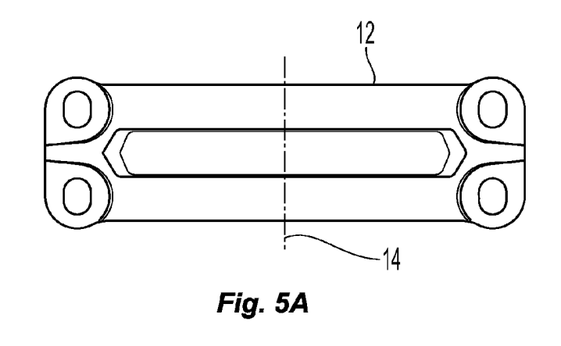
Figure 5B:
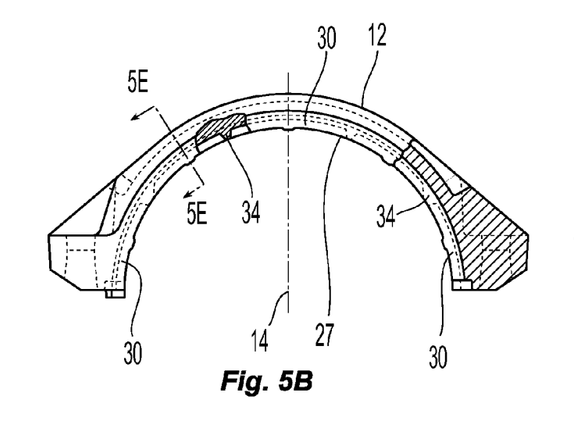
FIG. 5B is a plan view with partial cross sectional views.
Figure 5C:
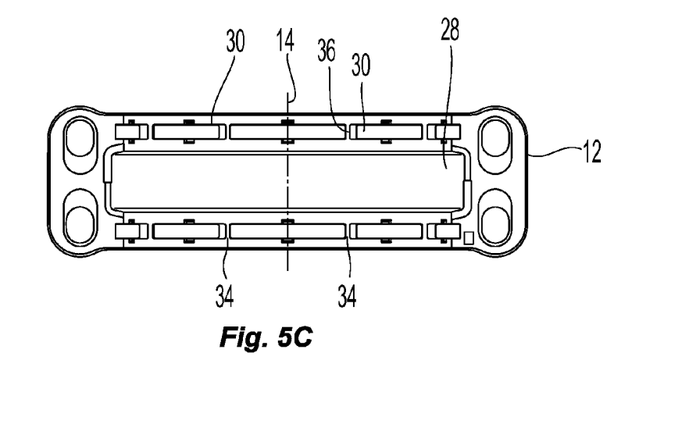
FIG. 5C is a bottom view.
Figure 5D:
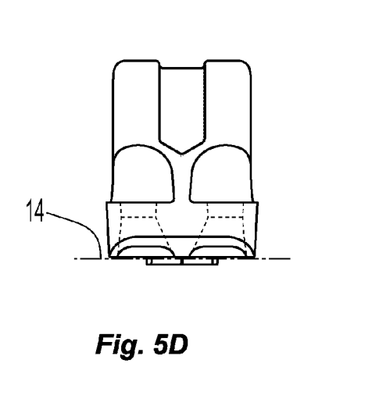
FIG. 5D is a side view.

As illustrated in FIGS. 1A-1F, the coupling assembly 10 includes the coupling housings 12. Preferably, the coupling assembly has two coupling housings 12 having an arcuate shape with the extensions 18 formed at each end of the arcuate shape. Alternatively, the coupling assembly has more than two coupling housings 12, such as three or four coupling housings formed to provide a complete coupling assembly. The coupling housings 12 are preferably cast from ductile iron, and are more preferably cast from ASTM A536 Grade 65-45-12 ductile iron. The coupling housings preferable have mating surfaces that abut each other whole or in part when the coupling housings are brought together to form the coupling assembly. The extensions of the coupling housings preferably have surfaces defining bolt holes extending through the extensions permitting the passage of a bolt to secure one housing to the other, with either a two-bolt design as illustrated in FIGS. 1B-1C or a four-bolt design as illustrated in FIGS. 1D-1F. As illustrated in FIGS. 4, 5A, and 5C, the bolt holes are preferably oval in cross section so as to permit the housings to adjust relative to each other, and to advantageously facilitate movement of the housings due to the movements caused by the inserts as the inserts engage the pipe ends during tightening of the bolts.

The coupling housings each have housing inner surfaces that align with each other when the coupling assembly is assembled to form the coupling inner surface 27. As illustrated in FIGS. 5A-5F, the coupling inner surface 27 provides a channel 28 for the seal. The channel is disposed centrally between the opposing ends of the coupling. The channel is defined by a curvature of the coupling inner surface that curves radially away from the axis 14 deeper into each of the housings 12, and is formed to receive the seal within the channel. The seal is disposed within the channel so that a portion of the seal extends radially inwardly into the passage to engage and seal the ends of the two pipes.

As also illustrated in FIGS. 5A-5G, the coupling inner surface provides pockets 30 disposed on each side of the channel 28 to form a first series of pockets at one end of the coupling and a second series of pockets at the opposing end of the coupling. Each series of pockets is formed by the alignment of individual pockets 30 in an end-to-end arrangement about an inner circumference of the coupling, with space (or non-pocketed areas) 34 between each pocket where the coupling inner surface 27 continues without curvature radially into or radially out of the coupling housings 12. The distribution of pockets circumferentially about the axis defines a portion of the circumference where the pockets are positioned and a portion of the circumference where the non-pocketed areas are positioned. For 360 degrees of circumference about the axis, the pockets preferably occupy a fraction of the circumference with separate pockets disposed at multiple locations about the circumference or, alternatively, as a single long pocket that is presented along the entire circumference. As the inserts are preferably slightly shorter than the pockets, the distribution of inserts in the pockets defines a portion of the circumference where the inserts are positioned and a portion of the circumference where no inserts are positioned. For 360 degrees of circumference about the axis, the inserts preferably occupy a fraction of the circumference with separate inserts disposed at multiple locations about the circumference. Alternatively, presented along the entire circumference is a single long insert or as a series of abutting inserts that together form a single long multiple-component insert.

Each pocket is formed by opposing side walls 35, opposing end walls 36, and a bottom wall 37 of the coupling to form a pocket 30 that extends into the coupling in a radially outward direction to the axis. Edges 38 of the side walls and edges of the end walls each adjoin the coupling inner surface to form an opening of the pocket that communicates with the coupling passage, and the bottom wall 37 adjoins all of the side and end walls 35, 36 to form a closed bottom of the pocket. Spacing between the opposing side walls provides a width of the pocket, and spacing between the opposing end walls provides a circumferential length of the pocket.

The side walls are each preferably sloped outward from the bottom of the pocket to the opening of the pocket, to provide an opening area that is larger than the bottom surface area of the pocket. The opening area of the pocket opening is preferably greater than the bottom surface area of the pocket bottom.

In a preferred embodiment, the housing is cast and, more preferably, cast with a sand casting technique. The pockets of the preferred embodiment formed during the sand casting of the housing have angled surfaces that are not parallel to each other due to the draft angle between the surfaces that facilitates the sand casting technique. The sloping of the side walls advantageously facilitates the use of sand casting to form the coupling housing, and thus eliminates the need for machined surfaces and reduces assembly complexity and eliminates the need for machining or additional components to secure the insert to the coupling housing. The preferred pocket formed by sand casting thus has surfaces that are angled to each other. The preferred insert has sides that are parallel to each other and, in the preferred arrangement with the insert disposed in the pocket, the parallel sides of the insert and the angled sides of the pocket thus define a space produced by the difference between the parallel and angled sides. This space increases in a direction from the bottom of the pocket to the edge of the pocket near the pocket opening. In a preferred embodiment, the projections extending from the pocket opening traverse this space to obstruct the pocket opening.

Figure 5E:
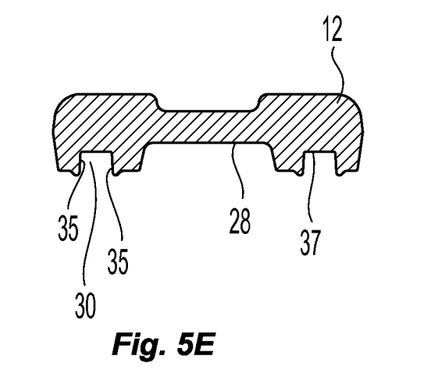
FIG. 5E is a cross-sectional view based on FIG. 5B.
Figure 5F:
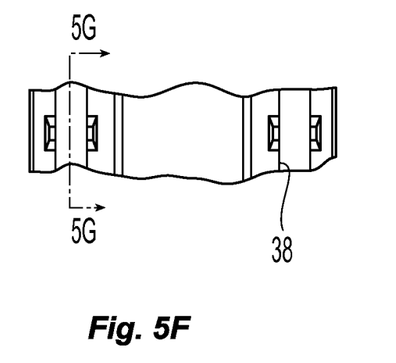
FIG. 5F is a partial bottom view of the cross-sectioned portions of FIGS. 5B and 5E.
Figure 5G:
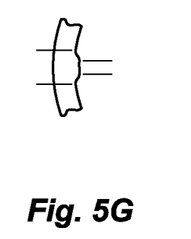
FIG. 5G is a partial side view based on FIG. 5F.
Figure 6A:
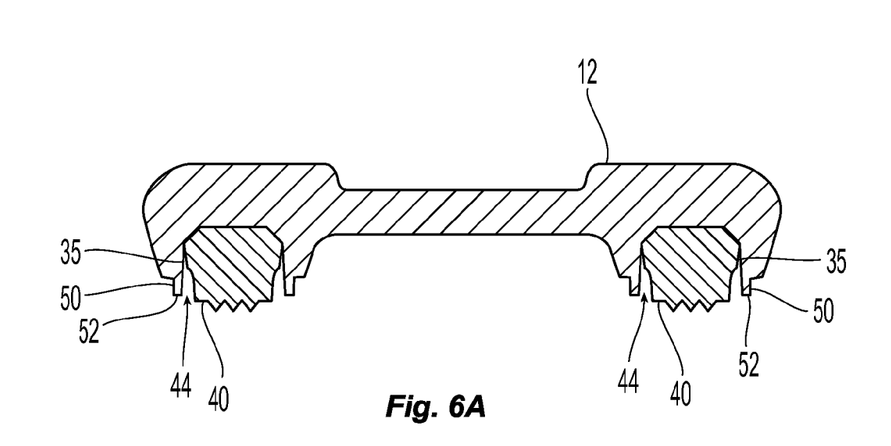
FIGS. 6A-6B are cross section views of a portion of the coupling assembly of FIG. 1A in two configurations.
Figure 6B:
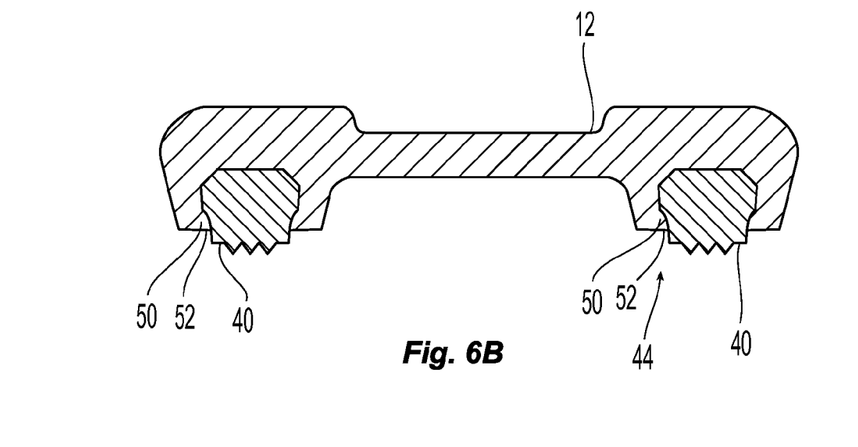

As illustrated in FIG. 6A, during assembly, the coupling housings are preferably made with the pocket side walls sloping away from each other towards the pocket opening. The projections 50 are also preferably formed so that the terminal ends 52 of the projections extend from the coupling inner surface 27 in a direction radially inward towards the axis of the coupling assembly, as illustrated in FIGS. 5E-5F and 6A. The insert 40 is then placed within the pocket and the projections 50 are aligned with the cavities 44 of the inserts. Using a press, the projections 50 are then compressed and deformed so that the terminal ends 52 of the projections extend in a direction that is parallel with the axis of the coupling assembly, to dispose the terminal end 52 within the cavity 44 as illustrated in FIG. 6B. During this compression and deformation process, the projection also is preferably flattened so as to present a continuous surface that matches the coupling inner surface 27. Alternatively, during this compression and deformation process, the side walls of the pockets are also deformed to assume a slope that is less than the original slope before the deformation, thus bringing the edges 38 of the side walls closer together. In this alternative, the side walls 35 are deformed inwardly sufficiently to compress the side walls against the insert 40 and to further retain the position of the insert within the pocket, as illustrated in FIG. 6B.

In a preferred embodiment, the volume of the projection corresponds to the volume of the cavity that the projection is to substantially fill after deformation of the projection, preferably by pressing. The projection thus provides a portion of the housing that can be moved, as permitted by the housing material characteristics and without significantly weakening the housing, from a first location to a second location within the cavity of the insert. In a preferred embodiment, the pre-pressed projection extends radially inward from the housing for a pre-pressed projection height of about 0.050-0.070 of an inch and, more preferably, of about 0.070 of an inch, and has a circumferential width of about 0.500 of an inch and narrows in a radial direction to a circumferential width of about 0.200 of an inch. Further preferably, the pocket provides a width between the pocket side walls supporting opposing pre-pressed projections that is about 0.460-0.465 of an inch wide. The preferable arrangement of pre-pressed projection height to pocket width is thus 0.050-0.070 to 0.460-0.465, which is a ratio having a range of 0.1075-0.1522. Also preferably, the insert provides a cavity that is about 0.050-0.060 of an inch deep from a side surface of the insert and, more preferably, is about 0.050 of an inch deep. In a preferred embodiment, the projection is deformed by pressing so that a majority of the insert cavity is occupied by the post-pressing projection. In an alternative embodiment, the material of the housing possesses sufficient ductility so as to not require the formation of a projection before pressing, thus presenting the pre-pressing projection as a portion of the housing body that is not structurally distinguishable from the housing body until after pressing when the projection is made to extend from the housing into the cavity of an insert.

In a preferred method of assembly, the insert is secured to the housing by disposing the insert between a coupling housing wall and the longitudinal axis in a space defined as being between axis of the coupling and the side of the insert facing the axis of the coupling. This space preferably has the shape similar to a prism with the base of the prism being the curved side of the insert and the peak of the prism being disposed along the axis where orthogonal lines coming off the curved insert side meet. In this preferred method of assembly, the insert is secured in the pocket by deforming a portion of the wall from a first position adjacent to the space to a second position within the space to secure the insert to the housing wall. In another preferred method, the insert is positioned to abut a wall of a coupling housing, and the insert is retained against the wall by deforming a portion of the wall that extends in a direction orthogonal to the axis of the coupling to a position that extends parallel to the axis. In yet another preferred method, the insert is secured to the housing by locating the insert within a pocket of the coupling assembly having an opening of the pocket with opposing projections, and then deforming terminal ends of the opposing projections to retain the insert within the pocket. In alternatives to these methods, the deforming of the wall may be achieved before the insert is placed in the pocket, such as when the projections are deformed and the insert is slide into the pocket from an end of the pocket that does not have a projection. In another alternative, the projections may be deformed partially, the insert placed in the pocket, and the projections then further deformed to secure the insert in the pocket. In still another alternative, the ends of the pockets may have the opposing projections, and one of the projections may be deformed and the insert disposed in the pocket so that an end of the insert abuts the deformed projection, and then the other non-deformed projection at the other end of the pocket may be deformed to secure the insert in the pocket.

Figure 2C:
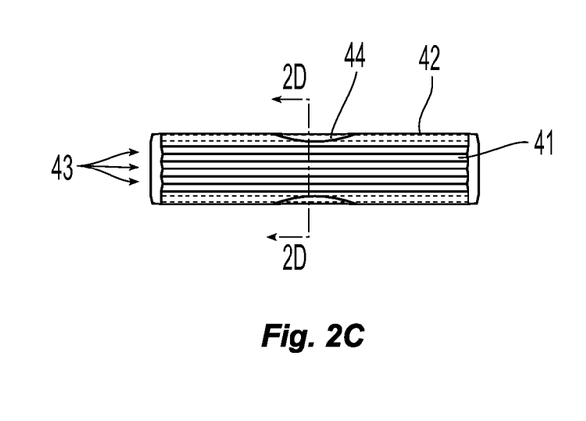
FIG. 2C is a bottom view.
Figure 2D:
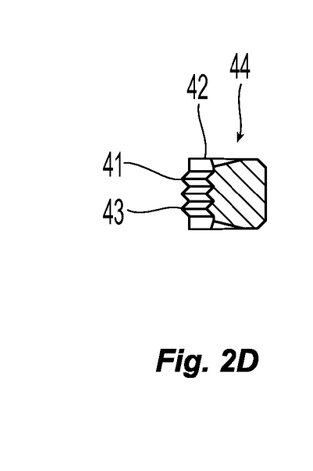
Figure 2E:
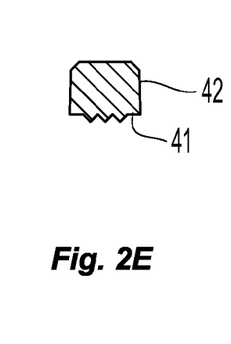
FIG. 2E is a cross-sectional view based on FIG. 2B.
Figure 3A:
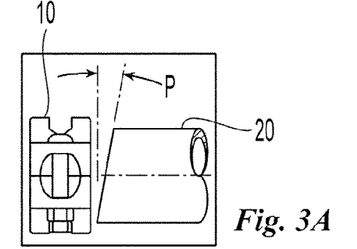
Figure 3B:
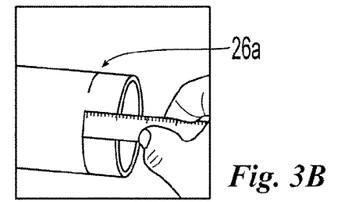
FIGS. 3B-3F schematically illustrate pipes and a seal.
Figure 3C:
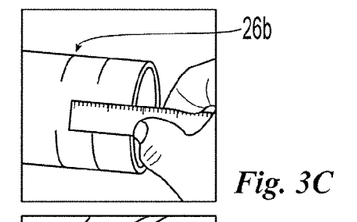
Figure 3D:
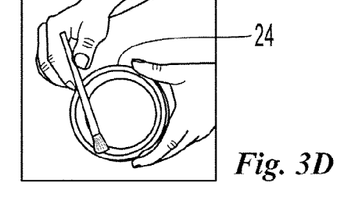
Figure 3E:
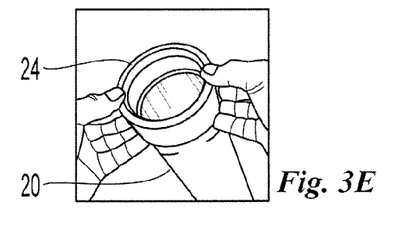
Figure 3F:
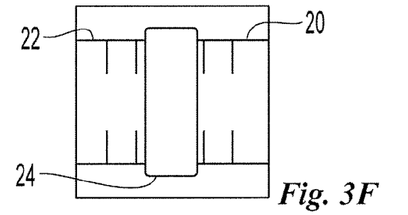
Figure 3G:
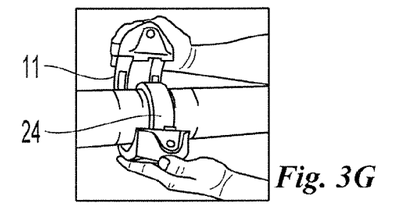
FIGS. 3G-3I schematically illustrate the coupling assembly of FIG. 1A with pipes and a seal.
Figure 3H:
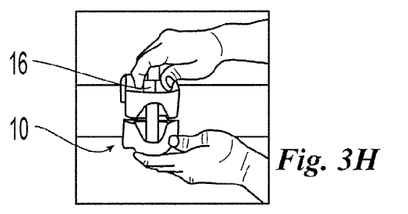
Figure 3I:
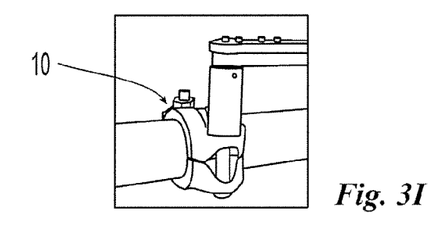

The inserts 40 are preferably shaped to have surfaces with a curvature that matches the curvature of the outer surfaces 21 of the pipe ends. The curvature of the insert presents the teeth in a curvature that matches the pipe ends, thus advantageously providing uniform contact between the teeth and pipe and maximize contact between the teeth and the pipe ends. The inserts are preferably made from a carbon steel and more preferably made from ASTM A-29 Grade 8620 UNS G86200 Carbon Steel. The inserts are also preferably formed with three rows 43 of teeth, as illustrated in FIGS. 1A, 2C, and 4. Each row 43 preferably provides a separate edge positioned to contact the surface of a pipe. The distribution of rows circumferentially about the axis defines a portion of the circumference where the rows are positioned and a portion of the circumference where the rows are not positioned. Preferably, for 360 degrees of circumference about the axis, each row occupies a fraction of the circumference with separate rows disposed at multiple locations about the circumference. As three rows 43 are provided in the preferred embodiment, the rows occupy three times the value provided for a single row 43.

The preferred embodiments secure the insert to the coupling housing by deforming a portion of the housing to obstruct the opening of the pocket in which the insert is disposed. The projections of the preferred embodiment and, more preferably, the terminal ends of the projections provide a means for obstructing the pocket opening to retain the insert in the pocket. Although the preferred embodiment provides opposing projections disposed on opposing sides of the pocket opening to retain the insert, additional embodiments may be provided to obstruct the pocket opening. In one alternative embodiment, two or more projections are disposed adjacent to each other on a side of the pocket opening. In another alternative embodiment, a single projection is disposed on only one side of the pocket opening and provided with sufficient length to obstruct the pocket opening and retain the insert in the pocket from a single side of the pocket opening. In yet another alternative embodiment, the projections are distributed about the edge of the pocket opening in varying arrangements about the circumference of the inner surface of the coupling assembly. In other alternative embodiments, some pockets have more than two projections, are disposed to not be opposed to each other across the pocket opening, are disposed to alternate along a length of the pocket, or are disposed at the ends of the pockets between adjacent pockets. In still other alternative embodiments, instead of defined projections, the side walls of the pocket have portions near the pocket opening that extend into the pocket to abut the sides of the insert and obstruct the pocket opening. Each of these alternative embodiments also provide a means for obstructing the pocket opening to retain the insert in the pocket. It should be understood that the inserts have cavities corresponding to the projections of the alternative embodiments and, alternatively, there may be multiple projections disposed in a single cavity.

In still other alternative embodiments, the means for obstructing the pocket opening to retain the insert in the pocket may be provided from the structure of the insert itself. In one alternative embodiment, the insert is formed with projections extending at the opening of the pocket to engage the walls of the pocket with a friction fit and obstruct the pocket opening to retain the insert in the pocket. In another alternative, the pocket opening extends into the pocket towards the pocket bottom, and projections provided on the walls of the insert engage the pocket walls to provide a friction fit and obstruct the pocket opening deeper within the pocket between the pocket bottom and the edge of the pocket where the pocket walls adjoin the inner surface of the coupling housing.

Figure 7:
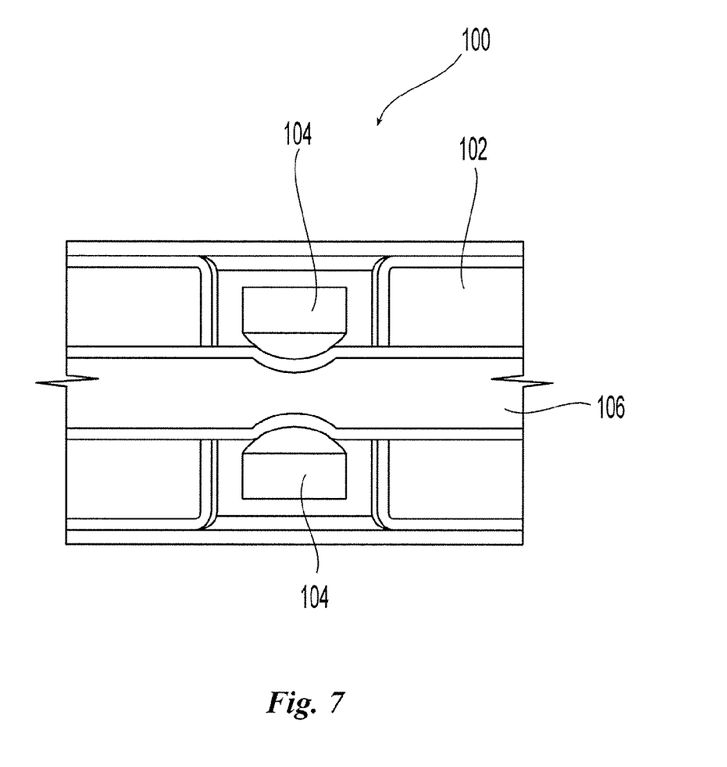
FIG. 7 is a perspective top view of the surface of a press plate of a preferred press.

After the inserts are disposed in a pocket, the inserts are preferably retained in the pocket by deforming a portion of the housing to obstruct the exit of the insert from the pocket. Preferably, the deforming is achieved by compressing a portion of the housing with a press. More preferably, opposing projections extending from the housing on opposing sides of the pocket are compressed with a press to deform the projections and make the projections extend within opposing cavities of the insert to retain the insert in the pocket. Still more preferably, the press includes a jig that holds the housing in a position that facilitates the pressing and deformation of the opposing projections with a press plate formed to achieve an orientation that disposes the projections within the cavities of the insert. In a preferred embodiment, a press supports a housing on a press base in an orientation that faces the inner surface of the housing towards a press piston. The press base holds a jig formed to stably secure the housing in a proper orientation. As illustrated in FIG. 7, the press piston holds a press plate 100 formed to have a surface 102 that has projection engagement portions 104 that deform projections of the housing disposed on each side of pockets of the housing. In use, the housing is disposed in the jig and secured, and an insert is placed in the pocket between the two opposing projections. The press piston is then brought down and the projection engagement portions 104 of the press plate 100 engage the projections and deform the projections in a direction towards the housing and towards the insert so as to abut the projections against cavities of the insert. More preferably, the press plate has multiple projection engagement portions 104 that simultaneously deform multiple projections for multiple inserts. In a preferred embodiment, the press plate 100 also defines a space 106 positioned to receive the insert extending from the pocket through the pocket opening to provide room for the insert to clear the surfaces of the press plate 100 that engage the housing.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A coupling assembly, comprising:
   at least first and second coupling members having mating extensions abutting each other at mating surfaces, the coupling members disposed on a longitudinal axis and defining an inner surface of the coupling assembly, the inner surface defining a central channel extending circumferentially along the inner surface about the longitudinal axis;
   a seal disposed in the central channel and facing the longitudinal axis;
   bolts extending through the mating extensions to join the first and second coupling members together;
   first and second series of pockets disposed circumferentially on the coupling assembly inner surface about the longitudinal axis, the central channel disposed between the first and second series of pockets, each pocket having a pocket bottom and opposing pocket walls extending from the pocket bottom to a pocket edge joining the inner surface and defining an opening of the pocket;
   an insert disposed in each pocket and extending through the opening of the pocket, the insert having an insert bottom wall abutting the pocket bottom, an insert top wall on an opposite side of the insert from the insert bottom wall and insert side walls facing the pocket walls, the insert including teeth projecting from the insert top wall towards the longitudinal axis, at least two of the insert side walls defining a respective insert cavity, each insert cavity being disposed on the corresponding insert side wall that extends circumferentially about the longitudinal axis and transverse to the inner surface of the coupling assembly; and
   opposing projections disposed on the inner surface at the pocket edge of each pocket, each projection having a terminal end extending in the direction of the longitudinal axis from the pocket edge into the corresponding insert cavities.

2. The coupling assembly of claim 1, the at least first and second coupling members including a third coupling member.

3. The coupling assembly of claim 1, the at least first and second coupling members including third and fourth coupling members.

4. The coupling assembly of claim 1, wherein:
   the insert having a cavity depth that is about 0.050-0.060 of an inch deep from the corresponding insert side wall.

5. The coupling assembly of claim 1, wherein:
   the insert having a cavity depth that is about 0.050 of an inch deep from the corresponding insert side wall.

6. The coupling assembly of claim 1, wherein the insert cavity is centrally located on the corresponding insert side wall in a circumferential direction of the inner surface of the coupling assembly.

7. The coupling assembly of claim 1, wherein a volume of each of the opposing projections substantially corresponds to a volume of the corresponding insert cavity.

8. A pipe coupling, comprising:
- a coupling housing body having an inner surface disposed circumferentially about a longitudinal axis, the inner surface defining a pocket opening communicating with a pocket extending into the housing body away from the longitudinal axis;
- an insert disposed in the pocket, the insert having an insert bottom wall abutting a bottom of the pocket, an insert top wall on an opposite side of the insert from the insert bottom wall and insert side walls facing walls of the pocket, the insert including teeth projecting from the insert top wall towards the longitudinal axis, at least two of the insert side walls defining a respective insert cavity, each insert cavity being disposed on the corresponding insert side wall that extends circumferentially about the longitudinal axis and transverse to the inner surface of the coupling housing body; and
- opposing projections on the inner surface of the housing body adjacent the pocket opening, each projection having a terminal end extending in the direction of the longitudinal axis from the inner surface into the corresponding insert cavity to obstruct the pocket opening and retain at least a portion of the insert in the pocket.

9. A method of securing an insert to a coupling housing body, comprising:
- locating the insert within a pocket of the coupling housing body having an inner surface disposed circumferentially about a longitudinal axis, the insert having an insert bottom wall abutting a bottom of the pocket, an insert top wall on an opposite side of the insert from the insert bottom wall, and insert side walls facing walls of the pocket, the insert including teeth projecting from the insert top wall towards the longitudinal axis, at least two of the insert side walls defining a respective insert cavity, each insert cavity being disposed on the corresponding insert side wall that extends circumferentially about the longitudinal axis and transverse to the inner surface of the coupling housing body;
- providing opposing projections on the inner surface of the coupling housing body adjacent the pocket; and
- deforming the terminal ends of the opposing projections such that each of the terminal ends extends in the direction of the longitudinal axis from the inner surface into the insert cavity to retain the insert within the pocket.

* * * * *